United States Patent [19]
Allen

[11] 3,979,003
[45] Sept. 7, 1976

[54] RE-USABLE FRANGIBLE CLOSURE
[75] Inventor: David O. Allen, Martinsville, Ohio
[73] Assignee: Buckeye Molding Co., New Vienna, Ohio
[22] Filed: Mar. 10, 1975
[21] Appl. No.: 557,083

Related U.S. Application Data
[63] Continuation of Ser. No. 387,352, Aug. 10, 1973, abandoned.

[52] U.S. Cl. .............................................. 215/256
[51] Int. Cl.² ....................................... B65D 41/32
[58] Field of Search ................. 220/270; 229/43; 215/254, 256, 255

[56] References Cited
UNITED STATES PATENTS

| 3,211,323 | 6/1962 | Foster | 220/270 |
| 3,474,930 | 10/1969 | Lerner | 222/182 X |
| 3,510,021 | 5/1970 | Silver | 215/254 |
| 3,672,528 | 6/1972 | Faulstich | 215/256 |
| 3,753,511 | 8/1973 | Ruch | 215/256 |
| 3,856,171 | 12/1974 | Rossi | 215/256 |

FOREIGN PATENTS OR APPLICATIONS

| 359,611 | 2/1962 | Switzerland | 220/270 |

Primary Examiner—George T. Hall
Attorney, Agent, or Firm—Dybvig & Dybvig

[57] ABSTRACT

There is disclosed a cup-like container closure of resilient and flexible thermoplastic material having a removable tear strip defined by an annular groove on the inner surface of the closure skirt. The tear strip includes a gripping portion adjacent opposite ends of the strip which are separated by a narrow gap. The closure skirt is substantially cylindrical and free from outwardly depending portions. Contents of the container are effectively sealed therein by tight interengagement of cooperating surfaces of the container and the closure. The closure is re-usable for closing the container after removal of the tear strip.

5 Claims, 6 Drawing Figures

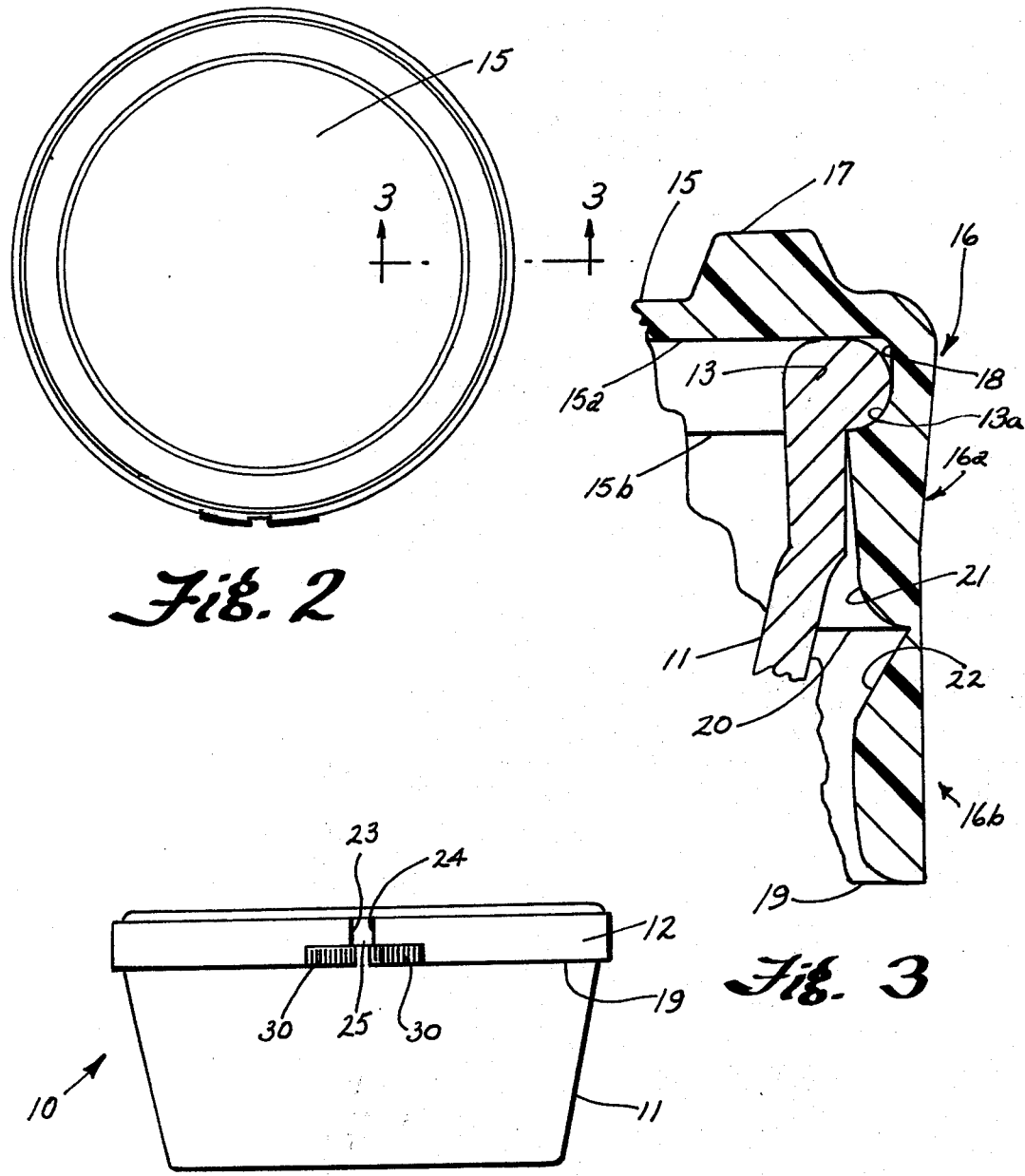

RE-USABLE FRANGIBLE CLOSURE

CROSS REFERENCE TO RELATED APPLICATION

This is a continuation of application Ser. No. 387,352 filed Aug. 10, 1973.

BACKGROUND

The present invention relates generally to merchandise packaging and, more particularly, to closures for sealing merchandise within a container in a tamper resistant manner with provisions for easy-opening of the container and for resealing thereof.

In the packaging of food and/or beverages, as well as other merchandise, it is desirable to provide closure means that can be easily and economically produced in desired quantities and which are usable and effective to enclose various types of contents within various types of containers.

Heretofore, various proposals have been made regarding closures and/or containers which proposals, in general, were directed toward the above-noted broad objectives. However, such prior proposals have failed to meet one or more of such objectives. For example, certain prior art devices provide for easy-opening of a container but lack tamper resistance features and/or are incapable of resealing a container after the initial opening thereof. Other prior art devices include structural elements readily engageable with other objects which often results in accidental damage to a merchandise package and/or its contents, and interferes with rolling operations that are highly desirable in connection with capping and/or labeling operations normally carried out after the contents have been placed in an open container.

SUMMARY

Accordingly, a principal object of the present invention is to provide means overcoming the above-noted difficulties. In accordance with the present invention, this is accomplished by the provision of a cup-like closure formed of resilient and flexible thermoplastic material and having a removable tear strip defined by an angular groove along the inner surface of the closure skirt. All structural elements of a closure embodying the present invention are confined within a substantially cylindrical outer surface and sealing of a container is accomplished by interengagement of cooperating surfaces of the container and the closure that remain after removal of the tear strip so that the closure is re-usable for closing the container after the tear strip has been removed.

DESCRIPTION

The foregoing and other objects and advantages of the invention will become apparent from the following description taken in connection with the accompanying drawings in which:

FIG. 1 is a side elevational view illustrating a container-closure package embodying the present invention;

FIG. 2 is a top plan view of the embodiment of FIG. 1;

FIG. 3 is an enlarged fragmentary sectional view looking in the direction of arrows 3—3 of FIG. 2;

Figures 4, 5:
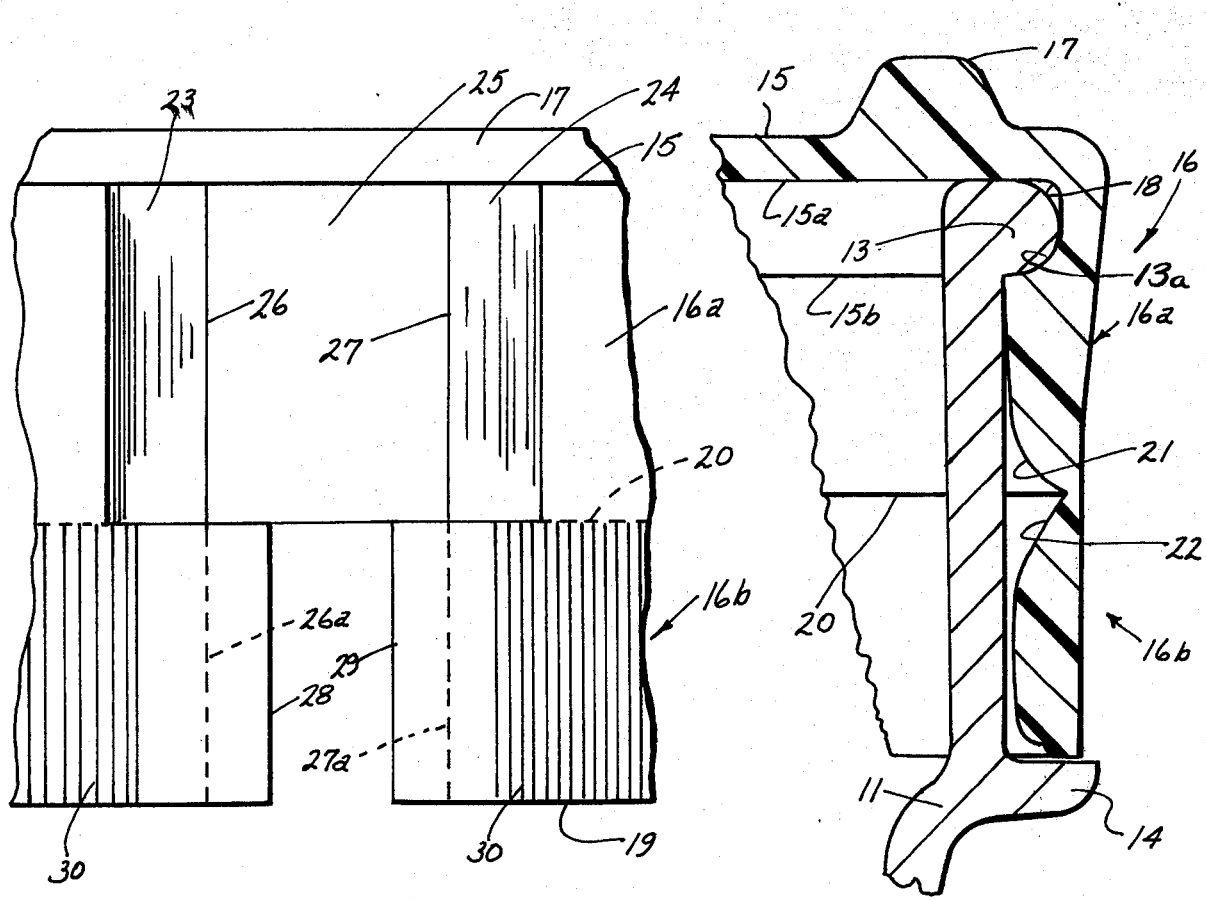
FIG. 4 is an enlarged fragmentary sectional view similar to that of FIG. 3 and showing a modification thereof.
FIG. 5 is an enlarged fragmentary elevational view illustrating details of the closure skirt in the vicinity of the gripping portions thereof.

Referring now to the drawings which illustrate a practical embodiment of the present invention, a merchandise package embodying the present invention is indicated generally at 10. In the drawings, a package embodying the present invention is illustrated in the form of a cup-like container and a closure therefor of the type often employed in the packaging of certain food items such as cheese, butter, and the like. However, it is to be understood that the drawings are intended for purposes of illustration only, and not of limitation, as the invention is not necessarily limited to the embodiments illustrated in the drawings.

Package 10 comprises a container 11 and a closure 12. As best shown in FIGS. 3 and 4, the upper open edge of container 11 is provided with a bead 13 and in some instances the container wall may also include a shoulder 14 spaced apart from and below bead 13.

Closure 12 comprises a central and generally flat top portion 15 having a skirt portion 16 depending downwardly from the outer marginal edge thereof. If desired, an annular upstanding stacking ring portion 17 may depend upwardly from top 15.

The inner surface of skirt portion 16 is grooved in the area lying between the lower surface 15a of the closure and lower line 15b. The lower portion of the groove generally conforms to the curvature of bead 13a provided on the container and the upper portion of said groove is cut away to form a clearance space indicated at 18.

For reasons which will become apparent as the description proceeds, the spacing between surface 15a and lower line 15b is somewhat less than the corresponding dimension of container bead 13. Similarly, the overall diameter of the container in the vicinity of bead 13 is somewhat greater than the corresponding inner diameter of the groove provided in the skirt portion.

The skirt portion 16 is provided with a weakened section at a location between the lower extremity of the skirt 19 and line 15b, as indicated by score line 20. The inner surfaces 21, 22 of skirt 16 slope in a generally outward direction and sharply intersect one another at line 20 to define the weakened section which extends substantially throughout the entire circumference of the skirt portion.

The outer surface of upper skirt portion 16a includes spaced-apart portions 23, 24 that slope inwardly and intersect with a depressed portion 25 therebetween.

Figure 6:
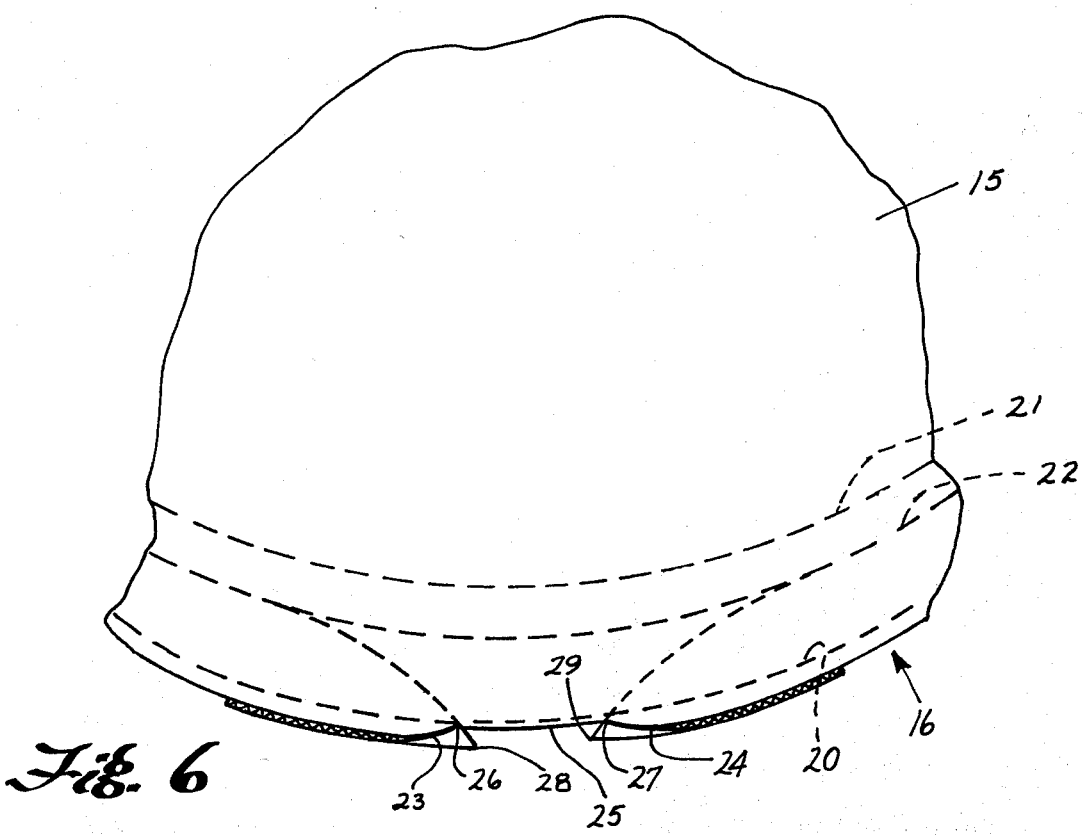
FIG. 6 is an enlarged fragmentary top plan view of the closure of FIG. 1.

As best seen in FIGS. 5 and 6, lower skirt portion 16b includes a notched or cut-out portion defined between the extremities 28, 29 of the lower skirt portion. These extremities overhang recessed portion 25 by an amount of the spacing between lines 26a, 27a and said extremities 28, 29, respectively. Serrations 30 are provided along the exterior surface of lower skirt portion 16b adjacent extremities 28, 29 to facilitate gripping between fingertips in a manner which will become apparent as the description proceeds.

Preferably, closure 12 is formed of a flexible and resilient material such as polyethylene. Container 11 may be formed of any suitable material and, if desired, the container may also be formed of polyethylene.

After container 11 has been filled with contents to be sealed therein, it is closed by stretching the closure over the upper open end of the container and thereafter forcing the cap downward until the lower surface 15a of the closure engages the upper surface of bead 13. In view of the relative dimensions of the groove in the upper portion of the closure and the size of bead 13, as noted above, the resiliency of the closure effects an effective seal between the closure and the container.

When it is desired to open the container and remove the contents thereof or some portion thereof, a knife, fingernail or other instrument is placed beneath one of the overhanging portions 28, 29 and lifted, thereby partially rupturing a portion of the skirt along score line 20. Thereafter, such lifted portion is easily grasped between the fingers and the remaining lower skirt portion is torn along score line 20 and ultimately is completely separated from upper skirt portion 16a. After such separation has been effected, any suitable instrument or the fingers are placed beneath the remaining skirt portion 16a which is then forced outwardly by exerting pressure against surface 21 and the flexibility of the closure material permits it to be removed from the container. Since separation of lower skirt portion 16b in no way destroys the integrity of upper skirt portion 16a, the closure can be re-used for resealing the container simply by forcing it down over the upper open end of the container as before. The height of serrations 30 is extremely small, of the order of 1/64 of an inch or less which is sufficient to provide a suitable gripping surface and yet the exterior surface of skirt 16 remains substantially cylindrical. If the serrations interfere with desired rolling operations, the outer diameter of lower skirt portion 16b may be somewhat reduced below that of upper skirt portion 16a to permit such rolling operations to be carried out effectively.

While a particular embodiment of the invention has been illustrated and described, it will be obvious that various changes and modifications can be made without departing from the invention and it is intended in the appended claims to cover all such changes and modifications that fall within the true spirit and scope of the invention.

What is claimed is:

1. A resilient deformable closure for sealing and/or re-closing a container having an open upper edge comprising
    a body formed of a molded plastic material and having a top portion and a skirt portion depending therefrom and having all portions of the distal extremity of said skirt portion parallel to said top portion.
    said skirt portion having an inner surface forming a re-entrant portion joined to the inner surface of said top portion and sealingly engaging the open upper edge and outer surface of a container when the closure is mounted thereon,
    a score line on said inner surface of said skirt portion forming a continuous weakened section in said skirt portion at a location between the distal extremity thereof and said re-entrant portion and forming a removable skirt portion between said weakened section and said distal extremity, and
    removal means including a pair of spaced-apart terminal tabs connected to said removable skirt portion and disposed between said weakened section and said distal extremity, said skirt portion also having an outer surface portion disposed above said weakened section and adjacent said pair of terminal tabs and recessed inwardly from other portions of the outer surface of said skirt portion, the peripheral extent of said recessed portion being slightly greater than the spacing between said terminal tabs to facilitate lifting and grasping thereof.

2. The combination comprising:
    a container comprising
        wall means defining an opening bounded by an upwardly directed edge portion of said wall means,
        a peripheral, outwardly projecting bead on the outer surface of said wall means adjacent said opening, and
        a peripheral shoulder on said wall means spaced from and below said bead; and
    a resilient deformable closure adapted to be stretched over said upwardly directed edge portion for sealing and/or reclosing said container comprising
        a body formed of a molded plastic material and having a top portion and a skirt portion depending therefrom,
        said skirt portion extending between said upwardly directed edge and said shoulder and terminating in a distal extremity parallel to said top portion, the outer surface of which is closely adjacent and in confronting relation to said shoulder when said closure is mounted on said container,
        said skirt portion having an inner surface joined to the inner surface of said top portion, said inner surface of said skirt portion having a re-entrant portion sealingly engaging outer surface portions of said container bead when said closure is mounted on said container,
        a score line on said inner surface of said skirt portion forming a continuous weakened section in said skirt portion at a location between said distal extremity thereof and said top portion and forming a removable skirt portion between said weakened section and said distal extremity, and
        removal means including a peripherally extending terminal tab connected to said removable skirt portion and disposed between said weakened section and said distal extremity.

3. The combination of claim 2 wherein said skirt portion has an outer surface portion disposed above said weakened section and adjacent said terminal tab and recessed inwardly from other portions of the outer surface of said skirt portion to facilitate the grasping of said terminal tab.

4. The combination of claim 3 wherein said terminal tab comprises one end of said removable skirt portion, the other end of said removable skirt portion terminating in a second terminal tab confronting and spaced from said first mentioned terminal tab, and said recessed portion having a peripheral extent slightly greater than the spacing between said terminal tabs.

5. The combination of claim 2 wherein said weakened section is located between said re-entrant portion and said distal extremity so that said re-entrant portion is not removed by removal of said removable skirt portion.

\* \* \* \* \*